United States Patent
Jankowski

[11] 4,085,538
[45] Apr. 25, 1978

[54] FISHING LURE

[76] Inventor: Tadeusz R. Jankowski, 2054 N. LaCrosse, Chicago, Ill. 60039

[21] Appl. No.: 706,695

[22] Filed: Jul. 19, 1976

[51] Int. Cl.$^2$ ............................................... A01S 85/01
[52] U.S. Cl. .................................................... 43/17.6
[58] Field of Search ............. 43/17, 17.6, 17.5, 42.25, 43/42.36; 240/6.4 F, 6.4 W, 10.6 R; 200/161

[56] References Cited
U.S. PATENT DOCUMENTS

| | | | |
|---|---|---|---|
| 3,800,136 | 3/1974 | Edelson | 240/10.6 R |
| 3,801,767 | 4/1974 | Marks | 200/161 |
| 3,848,354 | 12/1974 | Austad et al. | 43/42.25 |
| 3,940,868 | 3/1976 | Northcutt | 43/17.6 |

Primary Examiner—Russell R. Kinsey
Assistant Examiner—Robert P. Swiatek
Attorney, Agent, or Firm—John J. Kowalik

[57] ABSTRACT

A fishing lure incorporating a light emitting diode in a miniaturized watertight circuit assembly adapted to be easily transferable between different lures.

5 Claims, 8 Drawing Figures

FISHING LURE

BACKGROUND OF THE INVENTION

The employment of a battery operated light in a lure is well known. Such lights, however, are bulky and do not lend themselves to incorporation in lures, particularly of the fly types or in surface type lures which are adapted to skim over or near the top of water. The normal lamp arrangement is of a high drain type so that frequent replacement of the power source, i.e. the battery, is required, which is expensive.

SUMMARY OF THE INVENTION

This invention is directed to a novel fishing lure incorporating a fool-proof circuit in which the battery is coupled to a low drain light emitting diode encapsulated in a waterproof casing.

The invention in its broadest aspects has for one of its objects to provide a novel, simple circuit comprising in series a resistor, a source of emf and a switch for closing and breaking the circuit.

The invention contemplates a novel encasing capsule for the circuit components which incorporates a sleeve adapted to receive a line filament therethrough one end of which may be connected to the hook, and the capsule being concealed within an artificial fly which may be sleeved onto the filament, the tuft of the fly being formed of strands of feathers and the like and being draped about the capsule and in being pulled through the water, the strands closing and separating, causing the subtle light of the diode to wink.

Another object is to provide in one embodiment of the invention a novel circuit utilizing a transistorized switch in conjunction with a light sensitive, preferably selenium, photoelectric cell which increases in resistance as the light becomes reduced, as when the lure descends into the deep water or at night, the cell being connected in series with a light emitting diode and in parallel with a transistorized switch which prevents current from flowing through the diode when the resistance is low and which permits current flow through the diode when the resistance is high.

In the embodiments of the invention shown, various switching devices are disclosed such as a simple shunt in FIG. 2, a plug in-plug out diode in FIG. 4; and a spring contact in FIGS. 5-7.

These and other objects and advantages inherent in and encompassed by the invention will become more readily apparent from the specification and the drawings, wherein.

DESCRIPTION OF FIGS. 1-3

Figure 1:
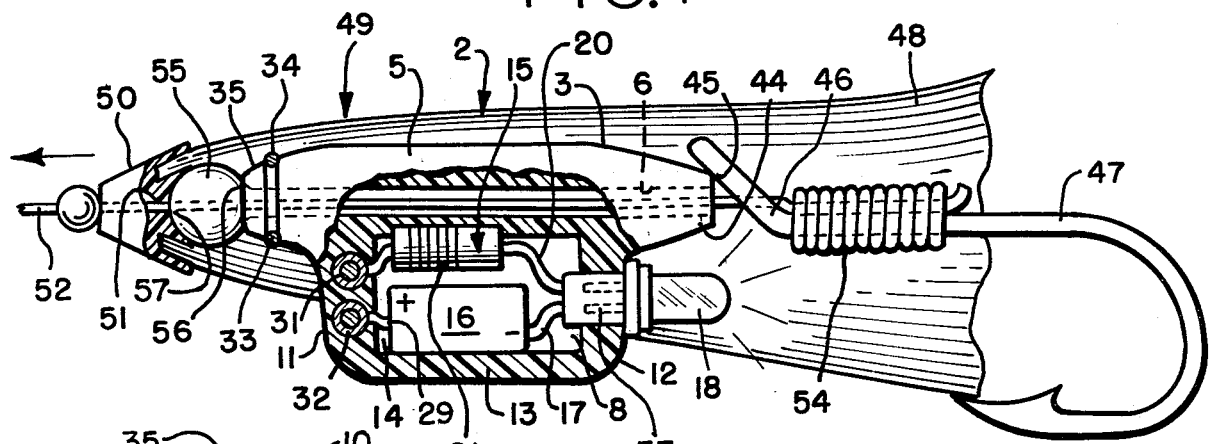
FIG. 1 is a side elevational view partly in longitudinal section of one form of my invention incorporated in a lure.

The lure generally designated 2 comprises a housing or casing 3 preferably simulating a fish body. The casing or capsule 3 is preferably a molded resin such as polyester, but may be of any material, polyester being preferred because it is of light weight and can be molded with a foaming agent as well known to those skilled in the art.

The body capsule 3 comprises a fusiform upper portion or section 5 which encases a tubular sleeve 6 extending fore and aft of the lure. The capsule 3 has a lower rectangular box-like portion 6' including lateral side panels or walls 7 and 8 which at their upper ends 9 join the lower portion 10 of the upper section 5. The side panels are interconnected by front, rear and bottom walls or webs 11, 12 and 13 to provide an enclosure generally designated 14 which houses the light circuit components indicated at 15.

The circuit comprises a 3 volt battery 16 having its negative pole connected by a wire lead 17 to one side of a diode 18 (identified in the trade as M-P2000) which in turn has its base 19 connected by a wire lead 20 to one end of a resistor 21 (preferably 500 ohms). The resistor 21 which controls the flow of the current has its other end connected by a wire lead 22 to one pole 24 of a switch 25, which has its other pole 27 connected by a wire lead 28 to the positive pole 29 of the battery 16.

In the embodiment of FIG. 1 the switch 25 may take the form of a common U-shaped wire shunt 30 which is insertable into two plugs 31,32 embedded in the plastic of the side wall 7 to complete the circuit across leads 22,28. The shunt 30 is preferably tethered by a thread or other flexible tong 33 within a groove 34 in the forward end 35 of the fusiform upper portion of the casing.

Figure 2:
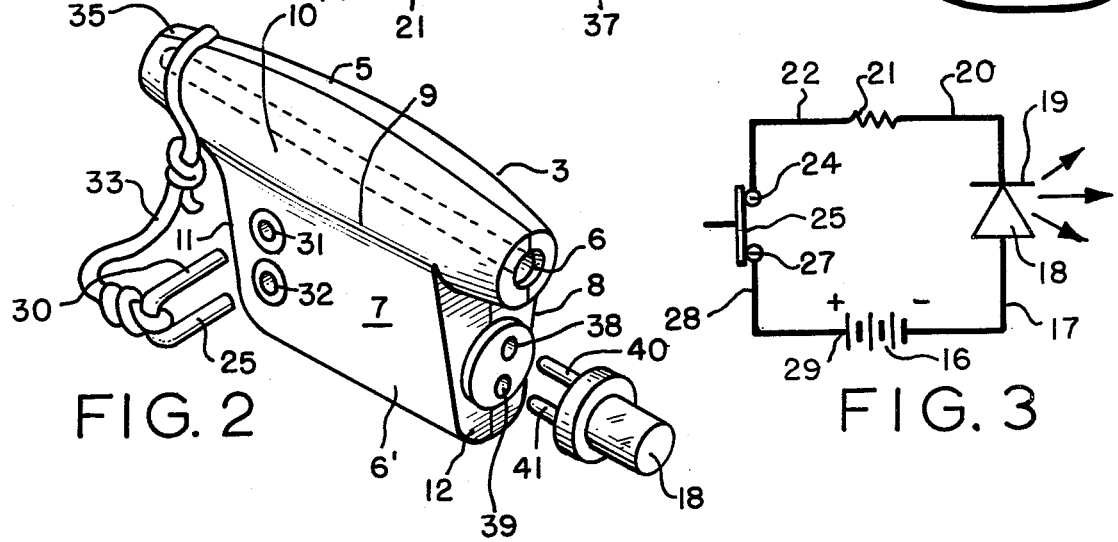
FIG. 2 is a perspective view of the invention.
Figure 3:
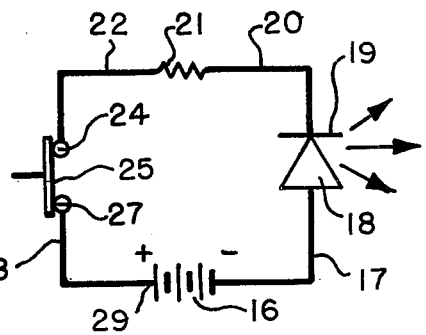
FIG. 3 is a schematic diagram of the circuitry of FIGS. 1, 2 and 4.
Figure 4:
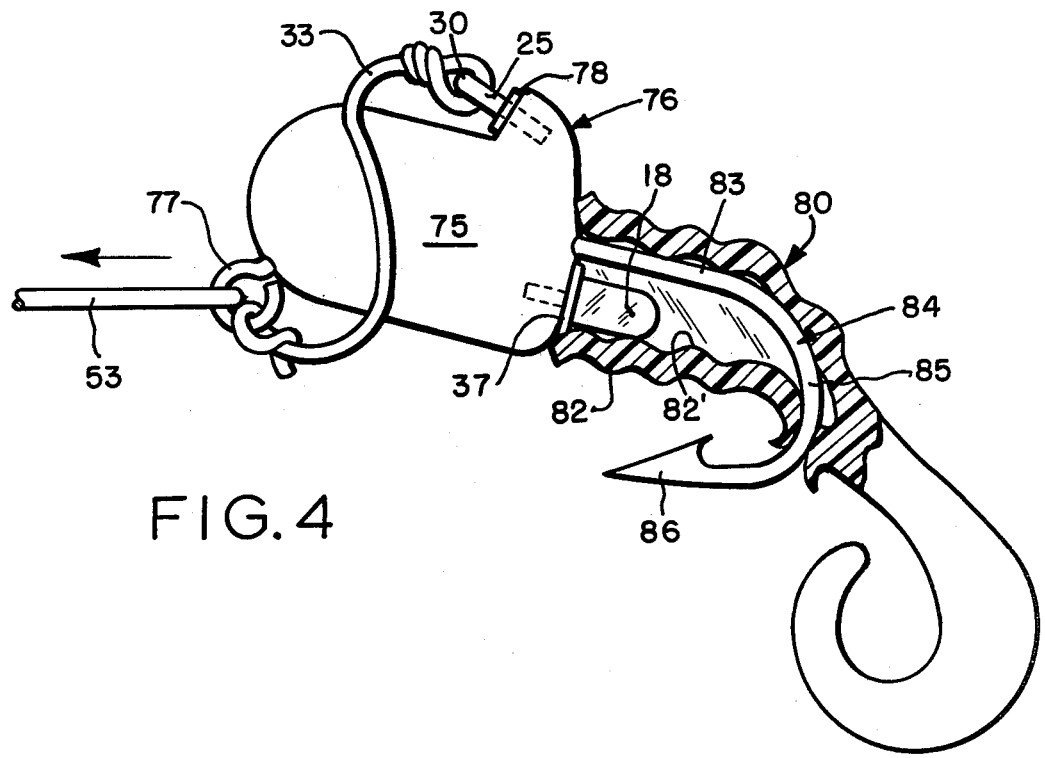
FIG. 4 is a side elevational view partly in longitudinal section of another embodiment of the invention.

As shown in FIG. 2, the rear wall 12 is molded about a female plug 37 with two sockets or receptacles 38,39 which selectively receive the two prongs 40,41 of the diode lamp 18. The diode lamp 18 projects beneath the stern or aft end 44 of the tubular upper section which at its rear end 45 abuts the eye 46 of a hook 47 which is concealed by the tuft 48 of the fly 49, which may have a conical forward portion 50 in which the tufts are embedded and secured. The conical portion has an aperture 51 therethrough, which is sleeved over the line or filament 52 of the fishing line, which is also threaded through the sleeve 6 and is attached to the hook by a knot 54. Preferably a bead 55 is also threaded on the line between the forward end 56 of the housing upper portion and the rear side 57 of the fly.

DESCRIPTION OF FIG. 4

Parts similar to the previous embodiment are identified by the same reference numerals. In this embodiment the shape of the body is modified and a stronger plastic such as polyethylene or polypropylene is used to form the body or housing 75 of the lure 76. An eye 77 is secured to the front end of the body to connect to the fish line 53. The tether 33 is secured at one end to the eye 77 and the other end to the U-shunt 30 which plugs into the socket 78 to complete the circuit as in the previous embodiment, and the diode lamp 18 also plugs into the socket 37 in the aft end of the body. A translucent worm 80 has a hollow body portion 82 at its front end defining a diode-admitting cavity 82' into which also projects the shank 83 of a hook 84 attached to the aft end of the body. The hook light 85 curves downwardly and pierces the worm body and terminates in a forwardly projecting ventral point 86.

Figure 5:
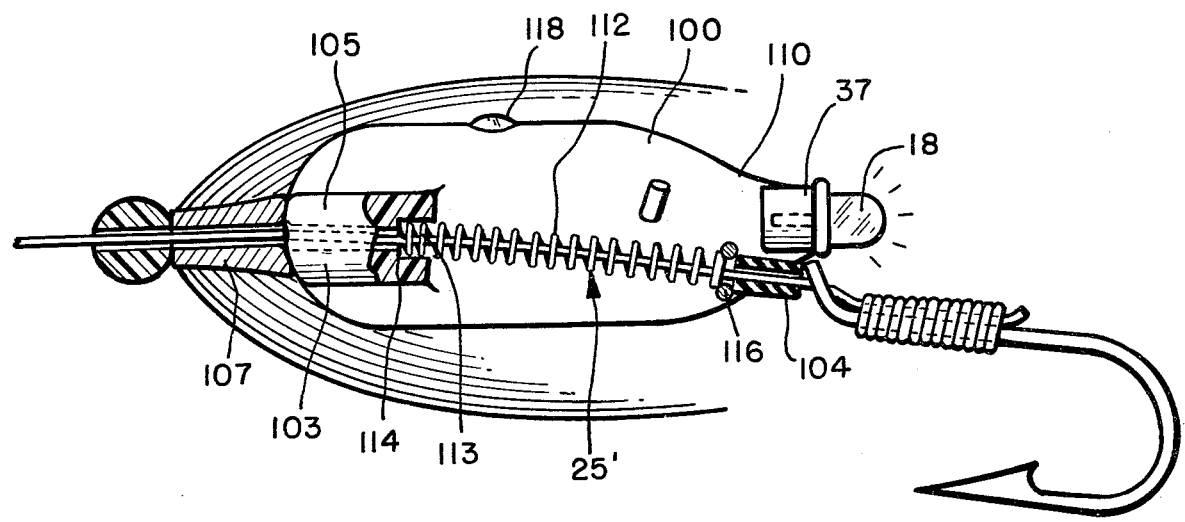
FIG. 5 is a bottom view of another embodiment of the invention.
Figure 6:
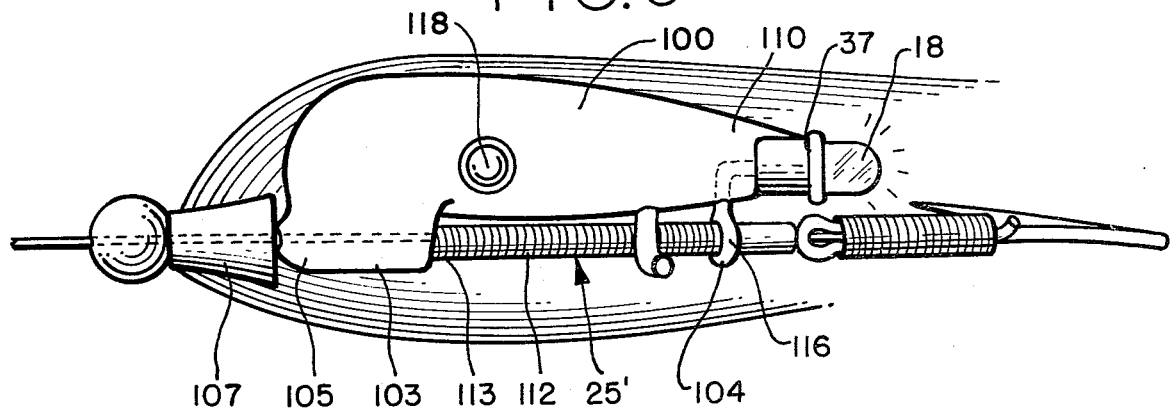
FIG. 6 is a side elevational view thereof.

DESCRIPTION OF FIGS. 5 and 6

In this embodiment parts similar to those in the other embodiments will be identified by the same reference characters.

This embodiment differs only in the provision of a different shaped body 100 than those previously and also is made of suitable plastic molded about the components. The switch 25' is also slightly different.

The line-admitting sleeve arrangement is at the bottom of the body and has front and rear coaxial sections 103,104, and the front nose 105 of the front section 103 abuts the rear end of the conical fly tuft mounting 107 which is also sleeved on the line. The diode 18 is mounted on the aft end 110 of the body in a socket 37. The switch 25' is in the form of a compression spring 112 which seats at its front end 113 against a contact 114 at one end of wire lead line 115 which connects to the negative pole of a battery 16. The other end of the spring in the closed position of switch 25' engages contact 115 at the end of wire lead line 116. Line 116 is connected to wire lead line 117, which connects to one end of a 39K ohm resistor 117a, the other end of which is coupled with one end of a photocell 118 (sold in the trade as M-P0001) and with the photocell to the base element 119 of a transistor switch 120. The line 116 also is connected to the collector element 122 of transistor 120 (which is sold in the trade as PNPF323934-314) and the emitter element 123 is connected via wire lead line 124 to the other end of the photocell 118 and to one end of the glow (lamp) diode 18 which at its other end is connected to the positive pole of the battery via lead line 125. The circuit is so formed that as less light hits the photocell 118 the resistance increases. The base current value drops off and the current then flows through the emitter-collector switch 25' to the battery, completing the circuit and lighting diode 18.

Figure 7:
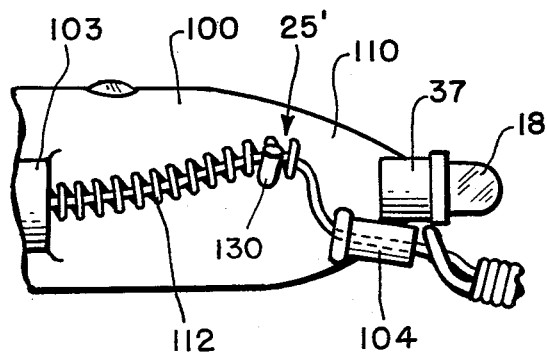
FIG. 7 is a fragmentary view showing the spring switch in off position.
Figure 8:
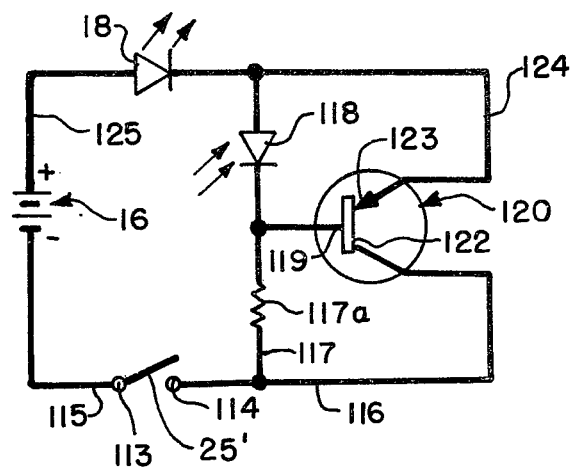
FIG. 8 is a diagramatic view of another embodiment of the invention.

It will be noted in FIG. 7 that switch 25' is disconnected. This is accomplished simply by deflecting the spring laterally over the retaining hook 130 secured at one side of the body on its underside. It will also be seen that the photocell 118 is molded into one side of the body to provide a sealed enclosure.

It will now be apparent that several preferred forms of the invention having been disclosed, other embodiments will become readily apparent to those skilled in the art which come within the scope of the claims appended hereto.

What is claimed is:

1. A fishing lure comprising a housing, a light emitting diode mounted thereon, an electrical circuit including a source of electromotive potential within the housing, and means for coupling said circuit with said diode for causing a current to flow therethrough to glow said diode, and said circuit comprising a switch in the form of a compression spring adapted to be threaded with the housing onto a fishing line, and said circuit including a pair of spaced contacts disposed in an open-circuit arrangement, and said spring being optionally positionable in bridging closed circuit arrangement with the contacts or displaced from at least one of the contacts in an open circuit arrangement.

2. A fishing lure comprising a housing, a light emitting diode mounted thereon, an electic circuit including a source of electromotive potential within the housing, and switching means for coupling said circuit with said diode for causing the current to flow therethrough to glow said diode, and semiconductor impedance means variable from low impedance to high impedance for controlling the amount of current flowing through said light-emitting diode in order to control the brightness thereof, said semiconductor impedance means consisting of a transistor having an emitter and collector in series with said source of electromotive potential, a series arranged resistance and photocell connected in parallel with said impedance means and said impedance means being connected between said source of electromotive potential and said light-emitting diode, and said transistor having a base connected between said resistance and said photocell.

3. The invention according to claim 2 and said circuit having components hermetically sealed in the housing and including an externally exposed mounting for said photocell embedded in said housing.

4. The invention according to claim 2 and said housing hermetically sealing the circuit components and comprising a longitudinal bore for admitting a fishing line therethrough for connection at one end of the housing to hook means.

5. The invention according to claim 4 and a fly having a carrier sleeved on the line in abutment with the forward end of the housing, and a tuft connected to the carrier and draped about the housing in concealing relation thereto.

* * * * *